US011434790B1

(12) United States Patent
Alden et al.

(10) Patent No.: US 11,434,790 B1
(45) Date of Patent: Sep. 6, 2022

(54) VALVE COVER LOAD DEFLECTION LIMITING SYSTEM

(71) Applicant: CUMMINS INC., Columbus, IN (US)

(72) Inventors: Glen R. Alden, Seymour, IN (US); Jason R. Griffin, Greenwood, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 17/216,575

(22) Filed: Mar. 29, 2021

(51) Int. Cl.
F02M 61/14 (2006.01)
F01M 11/00 (2006.01)
F01L 1/18 (2006.01)
B60R 16/02 (2006.01)

(52) U.S. Cl.
CPC ......... F01M 11/00 (2013.01); B60R 16/0207 (2013.01); F01L 1/18 (2013.01); F02M 61/14 (2013.01)

(58) Field of Classification Search
CPC .... F02M 51/005; F02M 69/465; F02M 61/16; F02D 2400/21; F02D 41/3005; H02G 3/0418; B60R 16/0207; B60R 16/0215; B60R 16/0222
USPC ........................ 123/188.1, 189, 195 A, 195 C
See application file for complete search history.

(56) References Cited

U.S. PATENT DOCUMENTS

| 3,929,109 | A | * | 12/1975 | Chamberlain | ....... | F02M 55/004 123/468 |
| 4,046,128 | A | * | 9/1977 | Formia | .................. | F02F 7/006 123/195 C |
| 6,098,583 | A | | 8/2000 | Gordon | | |
| 6,279,527 | B1 | * | 8/2001 | Glovatsky | .......... | B60R 16/0215 123/143 C |
| 6,766,714 | B2 | * | 7/2004 | Iwata | ........................ | F02F 7/00 74/606 R |
| 6,769,410 | B2 | * | 8/2004 | Lee | .................. | F02M 35/10085 123/184.61 |
| 6,832,587 | B2 | | 12/2004 | Wampula et al. | | |
| 7,178,508 | B2 | * | 2/2007 | Shioiri | ...................... | F01L 1/18 123/470 |
| 7,334,572 | B1 | * | 2/2008 | Diggs | ..................... | F02F 7/006 123/195 C |
| 7,610,893 | B2 | | 11/2009 | Waters et al. | | |
| 7,814,880 | B2 | | 10/2010 | Waters et al. | | |
| 10,041,458 | B2 | * | 8/2018 | Batchelor | .............. | F02M 61/14 |
| 2007/0023585 | A1 | * | 2/2007 | Judd | .................... | F02M 51/005 248/49 |
| 2009/0205601 | A1 | * | 8/2009 | Baker | ..................... | F01L 1/053 123/90.57 |
| 2012/0273648 | A1 | * | 11/2012 | Maske | ..................... | F01N 3/00 248/636 |
| 2017/0098926 | A1 | * | 4/2017 | Wisniewski | ........ | B60R 16/0215 |

(Continued)

FOREIGN PATENT DOCUMENTS

EP 1344930 A2 * 9/2003 ............. F01L 1/182

Primary Examiner — George C Jin
Assistant Examiner — Teuta B Holbrook
(74) Attorney, Agent, or Firm — Foley & Lardner LLP

(57) ABSTRACT

A system comprises a component manufactured via additive manufacturing. The component includes a first material with a first contraction rate. An insert is disposed in the component and comprises a second material with a second contraction rate that is lower than the first contraction rate. When the component and the insert are exposed to a temperature suitable for sintering, the component contracts around the insert, thereby coupling the insert and the component.

20 Claims, 3 Drawing Sheets

(56) References Cited

U.S. PATENT DOCUMENTS

2017/0328320 A1* 11/2017 Montgomery ....... F02M 51/005
2018/0238285 A1* 8/2018 Del Rossa ........... F02M 61/168

* cited by examiner

US 11,434,790 B1

VALVE COVER LOAD DEFLECTION LIMITING SYSTEM

TECHNICAL FIELD

The present disclosure relates to the protection of components within an engine system.

BACKGROUND

During a service event for a vehicle, a service technician may use an accessible portion of the vehicle to gain access to portions of the vehicle that are difficult to reach. For example, when the vehicle is a large vehicle (e.g., a semi-truck, etc.), the service technician may stand on or otherwise use the valve cover of the engine as support when performing the service. However, if the valve cover is not strong enough to support the weight of the service technician, damage to the valve cover and/or engine components underneath the valve cover can occur.

SUMMARY

One embodiment relates to an engine system. The engine system includes a valve cover and an intake portion coupled to the valve cover. The intake portion includes an injector hold down clamp defining an aperture and a wiring harness positioned on the injector hold down clamp and defining an opening. A load stop comprises a distal portion and an elongated portion. The distal portion is sized to fit within the aperture and the opening, and the elongated portion is positioned between the wiring harness and the valve cover.

Another embodiment relates to an engine system including a valve cover comprising an intake side and an exhaust side. An intake portion is coupled to the intake side of the valve cover and to an intake system and includes a load stop positioned between an injector hold down clamp and the intake side of the valve cover. An exhaust portion is coupled to the exhaust side of the valve cover and to an exhaust system. The exhaust portion includes a rocker shaft clamp and a connector securing the rocker shaft clamp. The connector is positioned between the rocker shaft clamp and the exhaust side of the valve cover.

Yet another embodiment relates to an engine system comprising a valve cover and an intake portion coupled to the valve cover. The intake portion includes an injector hold down clamp defining an aperture and a wiring harness positioned on the injector hold down clamp and defining an opening. A load limiter is positioned on the injector hold down clamp and within the opening and defines a passage. A load stop includes a distal portion and an elongated portion, the distal portion sized to fit within the aperture and the passage, and the elongated portion positioned between the load limiter and the valve cover.

DETAILED DESCRIPTION

Following below are more detailed descriptions of methods, apparatuses, and systems for protecting components within an engine system. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

During a service event for a vehicle, various components of different vehicle systems are repaired, replaced, or maintained. In order to repair, replace, or maintain the various components, a service technician must have physical access to those components. When performing service on a large vehicle, a service technician may use a valve cover of an engine as support for reaching other components. For example, the service technician may kneel on, stand on, or otherwise use the valve cover to support his or her body weight.

In some instances the valve cover may comprise a high strength plastic (e.g., a thermoset plastic) which is capable of supporting the weight of the service technician. In such instances, the valve cover protects components of the engine positioned underneath the valve cover. However, many high strength plastics cannot be recycled by re-melting for use in subsequent injection molding processes. As manufacturers move toward more sustainable materials (e.g., thermoplastics), those manufacturers must consider the relative strength of the sustainable materials as compared to the high strength plastics.

Embodiments described herein provide a system for protecting various engine components positioned underneath a valve cover in instances where the valve cover made from sustainable materials such as thermoplastics. In various embodiments, a load stop is positioned between a wiring harness and the valve cover on an intake side of an engine. The load stop provides a surface for the valve cover to contact as the valve cover is deflected, for example, by a service technician during a service event. The load stop prevents the valve cover from deflecting more than a predetermined amount to prevent the valve cover from contacting (and potentially damaging) engine components positioned underneath the valve cover.

In some embodiments, existing components on an exhaust side of the engine are configured to prevent the valve cover from deflecting more than the predetermined amount. For example, a connector that is typically used to secure a cover of a rocker arm assembly can also be used to prevent the valve cover from deflecting more than a predetermined amount.

It should be understood that, while the description and Figures herein are primarily directed to systems for protecting components within an engine system, this description is not meant to be limiting. The systems described herein are also applicable to accomplish other effects.

Figure 1:
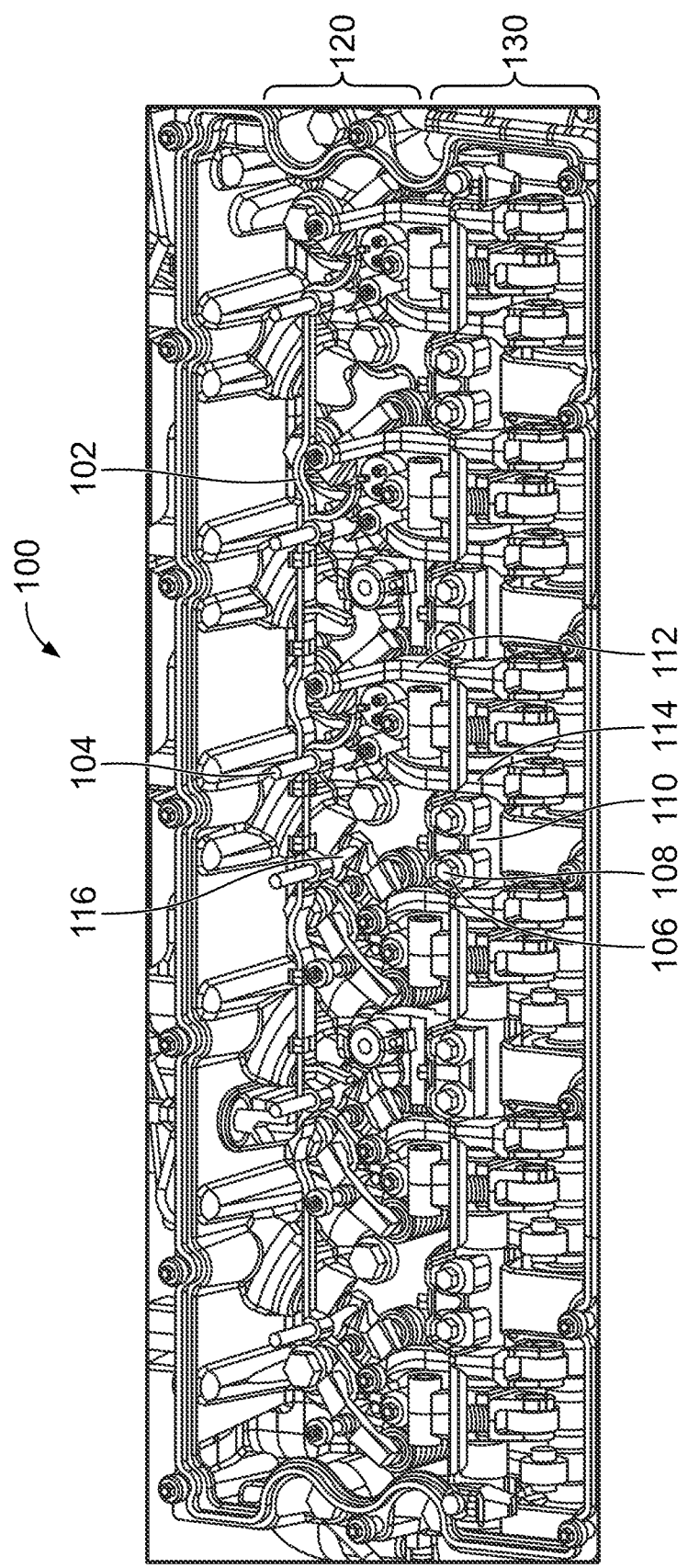
FIG. 1 is an illustration of a portion of an engine, according to a particular embodiment.

Referring now to FIG. 1, an illustration of a portion of an engine 100 is shown, according to a particular embodiment. The engine 100 is structured as a compression-ignition internal combustion engine that utilizes diesel fuel. However, in various alternate embodiments, the engine 100 may be structured as any other type of engine (e.g., spark-ignition) that utilizes any type of fuel (e.g., gasoline, natural gas). In still other example embodiments, the engine 100 may be or include an electric motor (e.g., a hybrid drivetrain). The engine 100 includes one or more cylinders and associated pistons. Air from the atmosphere is combined with fuel, and combusted, to power the engine 100. Combustion of the fuel and air in the compression chambers of the engine 100 produces exhaust gas that is operatively vented to an exhaust pipe.

The engine 100 is shown to include an intake side 120 and an exhaust side 130. The intake side 120 is coupled to an intake system (not shown) configured to direct air into one or more cylinders of the engine 100. The exhaust side 130 is coupled to an exhaust system (not shown) configured to direct exhaust gas from the one or more cylinders away from the one or more cylinders. In some embodiments, the exhaust gas is directed away from the engine 100. The exhaust gas may also be redirected toward the intake system via an exhaust gas recirculation system (not shown) to mix with air prior to entering the one or more cylinders.

The intake side 120 is shown to include a wiring harness 102, a load stop 104, and an injector hold down clamp 116. The wiring harness 102 is coupled with a power source (e.g., battery, etc., not shown) and is configured to direct power to various components within the engine 100. For example, the wiring harness 102 directs power to one or more fuel injectors positioned in or on the engine 100 such that fuel is injected into the one or more cylinders for combustion.

In some embodiments, the wiring harness 102 includes various plastic and metal components surrounding, enclosing, or otherwise housing wiring that transmits power from the power source to the fuel injectors. The plastic and metal components are formed into a specific shape (for example, by injection molding, machining, stamping, or various other manufacturing processes) such that the wiring harness 102 fits within, on, and/or around the various components of the engine 100. The wiring harness 102 is also formed to include various connection portions configured to connect to respective mating portions on the engine 100. In some instances, the wiring harness is configured to connect to one or more injector hold down clamps 116. An injector hold down clamp 116 is configured to secure a fuel injector to the engine 100 such that the fuel injector remains in place and directs fuel into a cylinder. In an engine that includes multiple cylinders (e.g., the engine 100), each cylinder may be coupled with a fuel injector such that each cylinder is coupled with an injector hold down clamp 116. As shown in FIG. 1, the engine 100 includes six cylinders; therefore six injector hold down clamps 116 are shown. One of skill in the art would understand that an engine with more or fewer cylinders would include an appropriate amount of fuel injectors and associated injector hold down clamps 116.

As shown in FIG. 1, the wiring harness 102 is secured to each of the injector hold down clamps 116 with a load stop 104. The load stop 104 includes a distal portion to interface with the injector hold down clamp 116 to secure the wiring harness 102 in place. The load stop 104 is also structured to prevent a valve cover (not shown) from contacting portions of the engine 100 when the valve cover is deflected. The load stop 104 and its structure and function are further described with reference to FIGS. 2-4.

The exhaust side 130 is shown to include a connector 106 with a top surface 108. The connector 106 can be any type of device or system configured to couple components (e.g., separate components or portions of a single component) together. In an example embodiment, the connector 106 is a cap screw. The top surface 108 is substantially flat (e.g., within ten percent of being perfectly flat) such that the top surface 108 is configured to interface with other surfaces that are substantially flat. In some embodiments, the top surface 108 is part of the connector 106 such that the top surface 108 is contiguous with the connector 106. The top surface 108 may also be a separate component coupled to the connector 106 to provide a substantially flat surface. The connector 106 is coupled with a rocker shaft clamp 110 such that a rocker shaft (not shown) is secured by the rocker shaft clamp 110.

Each of the one or more cylinders in the engine 100 is in communication with an intake rocker arm 112 and an exhaust rocker arm 114. The intake rocker arm 112 and the exhaust rocker arm 114 are coupled to the rocker shaft and are configured to move up and down to facilitate flow within the engine 100. For example, the intake rocker arm 112 moves up to open an intake valve to allow, for example, fuel and air to enter a cylinder in preparation for a combustion cycle. The intake rocker arm 112 moves down to close the intake valve to prevent fuel and air from entering the cylinder during cycles of the engine 100 that do not require combustion. The exhaust rocker arm 114 moves up to open an exhaust valve to allow, for example, exhaust gas to exit a cylinder after a combustion cycle has occurred. The exhaust rocker arm 114 moves down to close the exhaust valve to prevent fuel and air from exiting the cylinder prior to a combustion event occurring.

Figure 2:
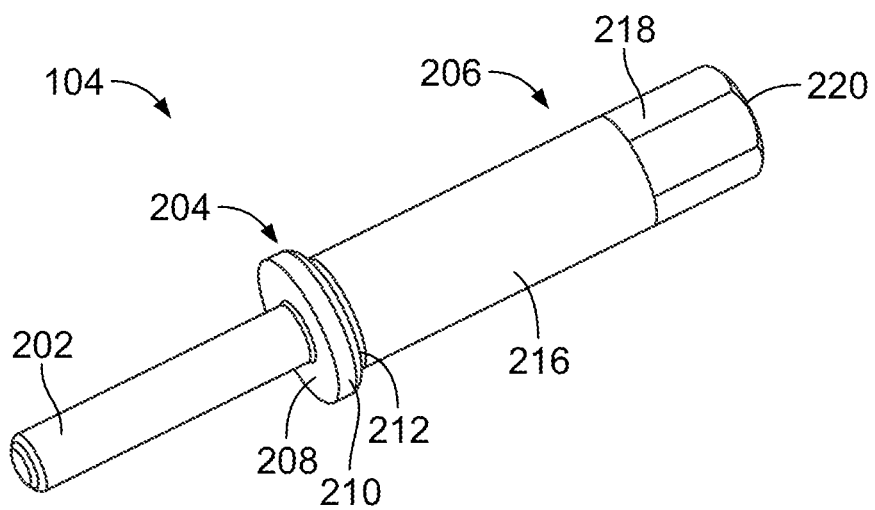
FIG. 2 is an illustration of an example load stop for use in the engine of FIG. 1.

FIG. 2 is an illustration of an example load stop 104 for use in the engine 100 of FIG. 1. The load stop 104 includes a distal portion 202, a central portion 204, and an elongated portion 206. The distal portion 202, the central portion 204, and the elongated portion 206 may be formed from a single piece of material such that the distal portion 202, the central portion 204, and the elongated portion 206 are a unitary body. In some embodiments, one or more of the distal portion 202, the central portion 204, and the elongated portion 206 may be formed from distinct pieces of material such that the distal portion 202, the central portion 204, and the elongated portion 206 are not a unitary body and are coupled with each other via known methods or processes.

The distal portion 202 is configured to couple the load stop 104 with another component within the engine 100 (e.g., the wiring harness 102, the injector hold down clamp 116, etc.). Accordingly, the distal portion 202 includes features to facilitate coupling such as, but not limited to, threads, tabs, slots, protrusions, recesses, etc., that are configured to interface with corresponding features on another component. In some embodiments, the distal portion 202 comprises a thread with a first dimension (for example, a major diameter of between approximately four millimeters and approximately eight millimeters).

The elongated portion 206 is coupled with the central portion 204 and extends in a direction opposite the distal portion 202. The elongated portion includes a shaft portion 216, a faceted portion 218, and a contact surface 220. The shaft portion 216 extends from the central portion 204 and is shown to comprise a substantially cylindrical shape with a substantially circular cross-section. In various embodiments, the shaft portion 216 may comprise a different shape and/or cross-sectional shape. The shaft portion 216 includes a second dimension (e.g., a length, a diameter, etc.) that is larger than the first dimension.

The faceted portion 218 is contiguous with the shaft portion 216 and comprises multiple facets (e.g., faces) such that the cross-sectional shape of the faceted portion 218 is different than the cross-sectional shape of the shaft portion 216. In some embodiments, the faceted portion 218 comprises a symmetric cross-sectional shape (e.g., square, pentagon, hexagon, octagon, etc.). The faceted portion 218 may also comprise a cross-sectional shape that is not symmetric. The faceted portion 218 is configured to interface with a tool (e.g., a wrench, etc.) such that the load stop 104 rotates when the tool rotates while the tool is interfaced with the faceted portion 218.

The contact surface 220 may be part of the faceted portion 218 such that the contact surface 220 is contiguous with the faceted portion 218. In some embodiments, the contact surface 220 may be part of a different component coupled with the faceted portion 218. The contact surface 220 is substantially flat (e.g., within ten percent of being perfectly flat) such that the contact surface 220 is configured to interface with other surfaces that are substantially flat.

As shown in FIG. 2, the contact surface 220 does not extend beyond the boundaries of the faceted portion 218. In some embodiments, the contact surface 220 extends beyond the boundaries of the faceted portion 218. For example, the contact surface 220 may comprise a circular shape with a diameter larger than the largest cross-sectional dimension of the faceted portion 218. In instances where a service technician exerts a load on the valve cover where the load is positioned between load stops 104, providing a larger contact surface 220 may allow the contact surface 220 to distribute the load through the load stop 104 more efficiently than if the contact surface 220 does not extend beyond the boundaries of the faceted portion 218.

The central portion 204 is coupled with, and positioned between, the distal portion 202 and the elongated portion 206 and includes a bottom surface 208, a top surface 212, and a middle portion 210 positioned between the bottom surface 208 and the top surface 212. As shown, the central portion 204 comprises a substantially circular cross-sectional shape; however, the central portion 204 include any cross-sectional shape that maintains the functionality of the central portion 204. The central portion 204 also comprises a third dimension (e.g., a length, a diameter, etc.) that is larger than both the first dimension and the second dimension.

Figure 3:
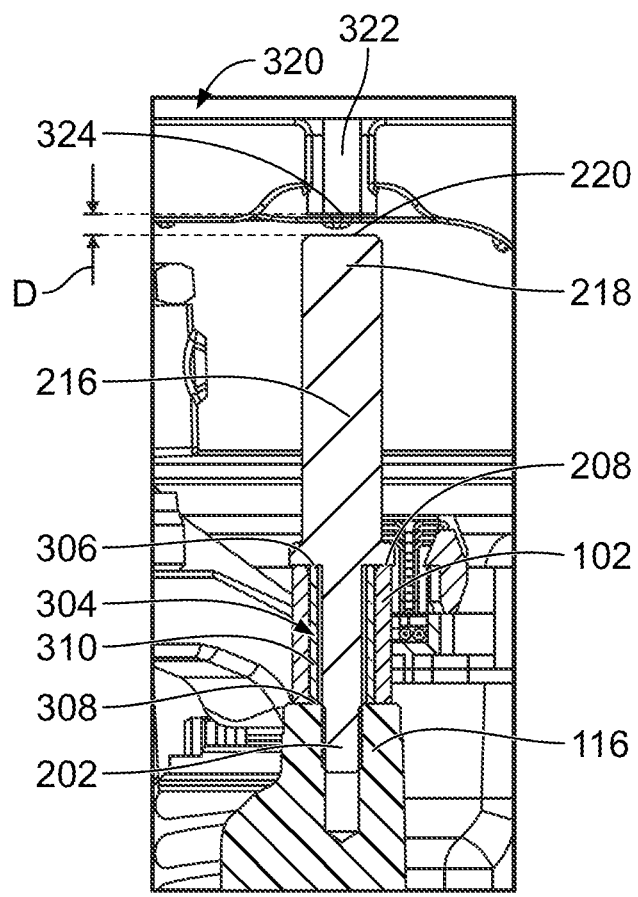
FIG. 3 is an illustration of a load stop coupled to a wiring harness, according to a particular embodiment.

FIG. 3 is an illustration of the load stop 104 coupled to the wiring harness 102, both of FIG. 1, according to a particular embodiment. As shown in FIG. 3, the load stop 104 is positioned beneath a valve cover 320. The valve cover 320 is configured to cover the various components of the engine 100 and protect such components from damage. In some embodiments, the valve cover 320 is manufactured using an injection molding process; therefore the valve cover 320 comprises any material suitable for injection molding. For example, the valve cover 320 may comprise a thermoset plastic material, a thermoplastic material, or any other type of plastic material.

The valve cover 320 is shown to include a protrusion 322 extending toward the contact surface 220 of the load stop 104. The protrusion 322 includes a contact surface 324 that is a substantially flat surface. In some embodiments, the contact surface 324 is part of the protrusion 322 such that the contact surface 324 and the protrusion 322 are contiguous. The contact surface 324 may also be a separate component coupled with the protrusion 322.

When the valve cover 320 is assembled to the engine 100, the contact surface 220 and the contact surface 324 are positioned substantially coaxially (e.g., a center of the contact surface 220 is substantially coaxial with a center of the contact surface 324) and are spaced apart by a distance D. D is the distance the valve cover 320 is allowed to deflect prior to the contact surface 220 interfacing with the contact surface 324, and it is determined based on the type of material used to manufacture the valve cover 320. For example, when the valve cover comprises a thermoplastic material, D may be between one millimeter and five millimeters in particular embodiments.

As shown in FIG. 3, the contact surface 324 does not extend beyond the boundaries of the protrusion 322. In embodiments where the contact surface 220 extends beyond the boundaries of the faceted portion 218, the contact surface 324 may extend beyond the boundaries of the protrusion 322 such that the size and shape of the contact surface 324 substantially matches the size and shape of the contact surface 220. For example, if the contact surface 220 comprises a circular shape with a diameter, the contact surface 324 may also comprise a circular shape with the same diameter. In instances where a service technician exerts a load on the valve cover where the load is positioned between load stops 104, providing the contact surface 324 with a size and shape that substantially matches the size and shape of the contact surface 220 may distribute the load of the service technician more efficiently through the load stop 104 than if the contact surface 324 and the contact surface 220 are substantially different sizes and/or shapes.

In some embodiments, the wiring harness 102 defines an opening sized to receive a load limiter 304. The load limiter 304 is generated by forming a strip of material (e.g., steel, aluminum, or any other type of metal or high strength material) into a substantially cylindrical shape, thereby defining a passage. In some embodiments, the load limiter 304 comprises an oblong cross-sectional shape. The load limiter 304 may also comprise various other cross-sectional shapes. As shown in FIG. 3, the load limiter 304 is configured to fit within the opening defined by the wiring harness 102 and rest on the injector hold down clamp 116. The load limiter 304 includes a bottom face 308 that interfaces with the injector hold down clamp 116 and a top face 306 that interfaces with the load stop 104. The load limiter 304 also includes a middle section 310 positioned between the top face 306 and the bottom face 308. The load limiter 304 is structured and positioned such that the top face 306 contacts the bottom surface 208 of the central portion 204 of the load stop 104, thereby distributing any loads on the load stop 104 through the load limiter 304 and then the injector hold down clamp 116. Positioned as described, the load limiter 304 prevents the load stop 104 from damaging the wiring harness 102 as the load stop 104 is exposed to a load.

In an example embodiment, the wiring harness 102 and the load limiter 304 are positioned on the injector hold down clamp 116 such that the opening of the wiring harness 102 is in line with the passage of the load limiter 304 and an aperture defined by the injector hold down clamp 116. The load stop 104 is assembled to the injector hold down clamp 116 by inserting the distal portion 202 through the opening of the wiring harness 102 and the passage of the load limiter 304 until the distal portion 202 interfaces with the aperture of the injector hold down clamp 116. The distal portion 202 is coupled with the injector hold down clamp 116 by rotating the load stop 104 (e.g., by using a tool to rotate the faceted portion 218) such that the distal portion 202 engages with the injector hold down clamp 116. For example, the distal portion 202 may include threads and the injector hold down clamp 116 may further define corresponding threads in the aperture. Accordingly, as the load stop 104 is rotated the threads of the distal portion 202 engage with the corresponding threads in the aperture. In some embodiments, the bottom surface 208 of the load stop 104 contacts the top face 306 of the load limiter 304 when the load stop 104 is completely assembled with the injector hold down clamp 116.

During a maintenance event, a service technician may use the valve cover 320 as support when attempting to reach another portion of a vehicle in which the engine 100 is disposed. Accordingly, the service technician may kneel on, stand on, jump on, or otherwise use the valve cover 320 to support the weight of the service technician. If the valve cover 320 is constructed from a thermoplastic material, the valve cover 320 may deflect under the weight of the service technician. In such an event, the valve cover 320 is permitted to deflect by the distance D before the contact surface 324 interfaces with (e.g., touches, contacts, etc.) the contact surface 220. When the contact surface 324 interfaces with the contact surface 220, the load of the service technician on the valve cover 320 is transferred through the load stop 104 and the load limiter 304 such that the load is supported by the injector hold down clamp 116. Constructed and operated as described, the valve cover 320, the load stop 104, and the load limiter 304 prevent damage to both the valve cover (for example, by preventing the valve cover 320 from deflecting more than a predetermined amount) and other internal components of the engine 100 (for example, by transferring the weight of the service technician on the valve cover 320 to the injector hold down clamp 116).

Figure 4:
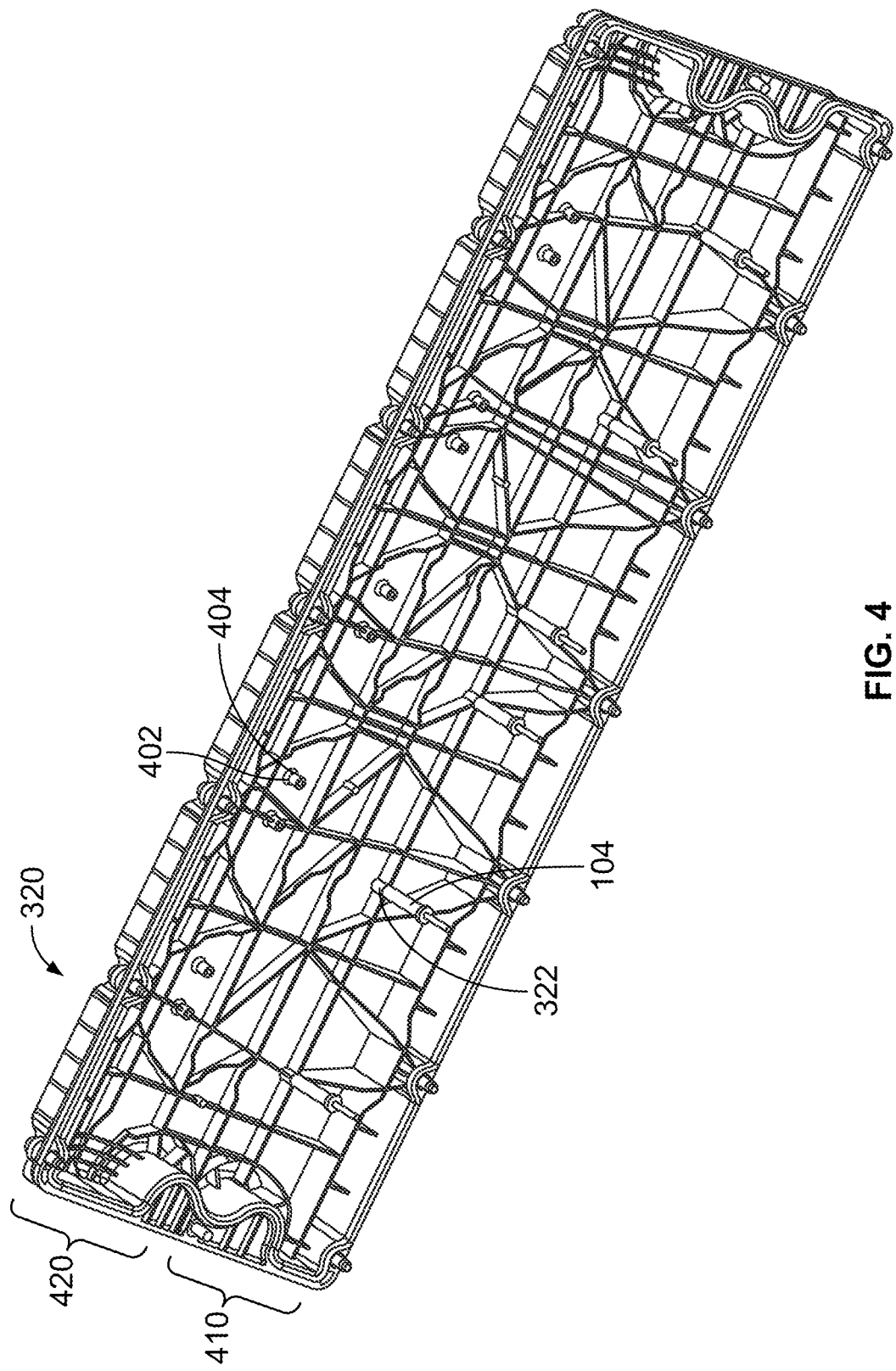
FIG. 4 is an illustration of an engine valve cover, according to a particular embodiment.

FIG. 4 is an illustration of an example valve cover 320, according to a particular embodiment. As shown, the valve cover 320 further includes an intake side 410 and an exhaust side 420. The intake side includes the protrusion 322 as described with reference to FIG. 3. The load stop 104 is also shown adjacent to the protrusion 322 for illustrative purposes. The exhaust side 420 is shown to include a post 402 and a contact surface 404. The contact surface 404 is structured and positioned to interface with the top surface 108 of the connector 106 in FIG. 1. Accordingly, and similar to the function of the load stop 104 on the intake side 410, the top surface 108 of the connector 106 prevents the valve cover 320 from deflecting more than a predetermined amount (e.g., between one millimeter and five millimeters) when a load is applied to the valve cover 320 (e.g., when a service technician uses the valve cover 320 as support).

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. An engine system, comprising:
   a valve cover;
   an intake portion coupled to the valve cover, the intake portion comprising;
      an injector hold down clamp defining an aperture;
      a wiring harness positioned on the injector hold down clamp and defining an opening; and
      a load stop comprising a distal portion and an elongated portion, the distal portion sized to fit within the aperture and the opening, the elongated portion positioned between the wiring harness and the valve cover.

2. The engine system of claim 1, wherein the distal portion comprises a first dimension and the elongated portion comprises a second dimension that is larger than the first dimension.

3. The engine system of claim 2, wherein the load stop further comprises a central portion positioned between the distal portion and the elongated portion, the central portion comprising a third dimension that is larger than the first dimension and the second dimension.

4. The engine system of claim 3, wherein the elongated portion comprises a shaft portion and a faceted portion, the shaft portion positioned between the central portion and the faceted portion.

5. The engine system of claim 4, wherein the elongated portion further comprises a contact surface contiguous with the faceted portion, the contact surface positioned so as to interface with a protrusion on the valve cover when the valve cover is deflected by a predetermined amount.

6. The engine system of claim 5, wherein when the protrusion on the valve cover interfaces with the contact surface, the load stop prevents the valve cover from deflecting by more than the predetermined amount.

7. The engine system of claim 5, wherein the predetermined amount is between 1.0 millimeters and 5.0 millimeters.

8. An engine system comprising:
a valve cover comprising an intake side and an exhaust side;
an intake portion coupled to the intake side of the valve cover and to an intake system, the intake portion comprising a load stop positioned between an injector hold down clamp and the intake side of the valve cover, the load stop comprising a distal portion and an elongated portion, the distal portion interfacing with the injector hold down clamp and the elongated portion extending in the opposite direction of the distal portion;
an exhaust portion coupled to the exhaust side of the valve cover and to an exhaust system, the exhaust portion comprising;
a rocker shaft clamp; and
a connector securing the rocker shaft clamp, the connector positioned between the rocker shaft clamp and the exhaust side of the valve cover.

9. An engine system comprising:
a valve cover comprising an intake side and an exhaust side;
an intake portion coupled to the intake side of the valve cover and to an intake system, the intake portion comprising a load stop positioned between an injector hold down clamp and the intake side of the valve cover;
an exhaust portion coupled to the exhaust side of the valve cover and to an exhaust system, the exhaust portion comprising;
a rocker shaft clamp; and
a connector securing the rocker shaft clamp, the connector positioned between the rocker shaft clamp and the exhaust side of the valve cover, wherein the connector comprises a top surface positioned to interface with a post on the exhaust side of the valve cover when the exhaust side of the valve cover is deflected by a predetermined amount, and wherein the load stop comprises a contact surface positioned to interface with a protrusion on the intake side of the valve cover when the intake side of the valve cover is deflected by the predetermined amount.

10. The engine system of claim 9, further comprising a load limiter positioned on the injector hold down clamp.

11. The engine system of claim 10, wherein the load stop comprises a central portion positioned to contact the load limiter.

12. The engine system of claim 11, wherein the load stop further comprises:
a distal portion that couples with the injector hold down clamp, the distal portion coupled with and extending from the central portion; and
an elongated portion coupled with and extending from the central portion, the elongated portion comprising the contact surface.

13. The engine system of claim 11, wherein when the intake side of the valve cover deflects by the predetermined amount, the load limiter prevents the load stop from damaging a wiring harness.

14. An engine system comprising:
a valve cover comprising an intake side and an exhaust side;
an intake portion coupled to the intake side of the valve cover and to an intake system, the intake portion comprising a load stop positioned between an injector hold down clamp and the intake side of the valve cover;
an exhaust portion coupled to the exhaust side of the valve cover and to an exhaust system, the exhaust portion comprising;
a rocker shaft clamp; and
a connector securing the rocker shaft clamp, the connector positioned between the rocker shaft clamp and the exhaust side of the valve cover, wherein the connector comprises a top surface positioned to interface with a post on the exhaust side of the valve cover when the exhaust side of the valve cover is deflected by a predetermined amount, and wherein the load stop comprises a contact surface positioned to interface with a protrusion on the intake side of the valve cover when the intake side of the valve cover is deflected by the predetermined amount,
wherein when the exhaust side of the valve cover deflects by the predetermined amount, the rocker shaft clamp prevents the connector from damaging a rocker shaft positioned under the rocker shaft clamp.

15. An engine system, comprising:
a valve cover;
an intake portion coupled to the valve cover, the intake portion comprising;
an injector hold down clamp defining an aperture;
a wiring harness positioned on the injector hold down clamp and defining an opening;
a load limiter positioned on the injector hold down clamp and within the opening, the load limiter defining a passage; and
a load stop comprising a distal portion and an elongated portion, the distal portion sized to fit within the aperture and the passage, the elongated portion positioned between the load limiter and the valve cover.

16. The engine system of claim 15, wherein the wiring harness comprises a first height and the load limiter comprises a second height that is greater than the first height.

17. The engine system of claim 16, wherein the distal portion comprises a first dimension and the elongated portion comprises a second dimension that is larger than the first dimension.

18. The engine system of claim 17, wherein the load stop further comprises a central portion positioned between the distal portion and the elongated portion, the central portion comprising a third dimension that is larger than the first dimension and the second dimension such that the central portion contacts the load limiter.

19. The engine system of claim 18, wherein the elongated portion comprises a shaft portion and a faceted portion, the shaft portion positioned between the central portion and the faceted portion.

20. The engine system of claim 19, wherein the load limiter further comprises a contact surface contiguous with the faceted portion, the contact surface positioned to interface with a protrusion on the valve cover when the valve cover is deflected by a predetermined amount.

* * * * *